Oct. 4, 1960 A. CAMPO 2,955,187
FILTERED SUCTION DESOLDERING TOOL
Filed Jan. 19, 1959
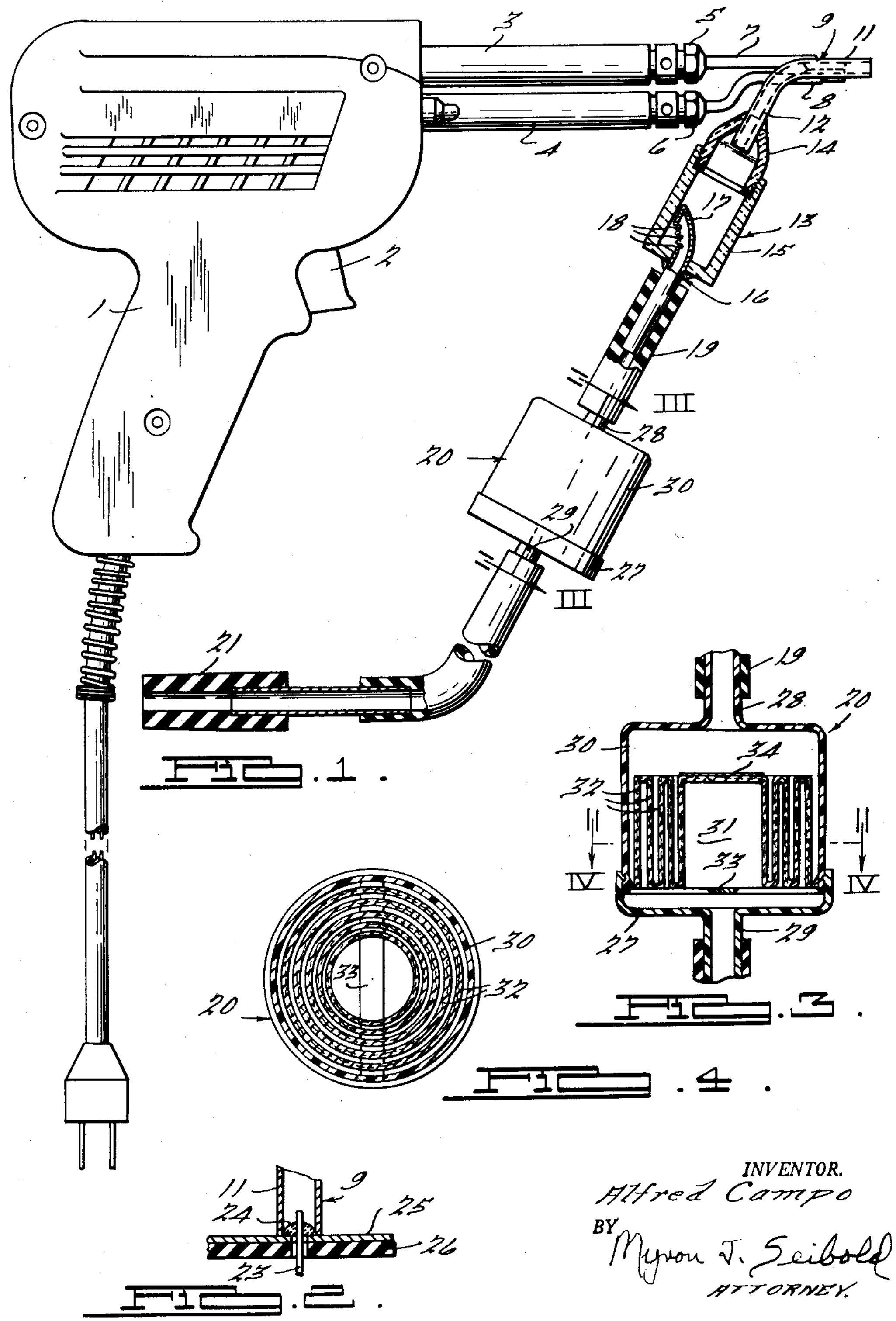
INVENTOR.
Alfred Campo
BY Myron J. Seibold
ATTORNEY.

2,955,187
Patented Oct. 4, 1960

2,955,187

FILTERED SUCTION DESOLDERING TOOL

Alfred Campo, 15045 Braile, Detroit 32, Mich.; Lillian M. Campo, executrix of said Alfred Campo, deceased Filed Jan. 19, 1959, Ser. No. 787,453

8 Claims. (Cl. 219—26)

This invention relates to a filtered suction desoldering tool applicable to existing soldering guns and particularly adapted for work on printed circuit boards. This application is a continuation-in-part of copending application Serial Number 667,800, filed June 25, 1957, for Desoldering Tool, now Patent No. 2,882,380, granted April 14, 1959.

The object of this invention is a desoldering tool having a heated tubular tip of a size to fit over a component terminal to melt the solder thereat and providing for oral suction of molten solder away from the connection, with effective filter means for removing metal dust and fumes from the air train to prevent the possibility of injury to the operator.

Other objects and features of the invention will be readily apparent to those skilled in the art from the specification and appended drawing illustrating certain preferred embodiments in which:

Figure 1 is a view partly in elevation and partly in section of a desoldering tool according to the present invention.

Figure 2 is a detail view in section showing the application of the tip of the desoldering tool about a component terminal in desoldering position.

Figure 3 is a sectional view through the filter along line III—III of Figure 1.

Figure 4 is a sectional view along line IV—IV of Figure 3.

The tool of this invention is illustrated in the drawing, for purpose of explanation, as a conversion kit applied to a standard soldering gun indicated generally at 1 and having a controlling switch trigger 2 and main conducting arms 3 and 4. Arms 3 and 4 have conventional end clamps 5 and 6, respectively, normally holding the removable heating arms of a soldering gun.

The heating arms forming the tip of a soldering gun are removed and substituted therefor are heating arms 7 and 8 at whose juncture is a brazed or integral tube 9 of relatively high heat conductivity material, low mass and an interior bore of a size to fit over the terminal of a board component. The projecting end of tube 9 is straight as at 11 and terminates in a cut at substantially right angles to its axis. The interior end of tube 9 is curved at 12 for clearance and is there cemented, screwed, slip fitted, or otherwise mounted in one end of a cup or chamber 13 of porcelain or other ceramic material, the chamber having two sections 14 and 15 with the tube 9 mounted to the section 14. The sections are shown screwed together for easy disassembly.

In the chamber section 15 is cemented or otherwise mounted a tube 16 having a curved interior portion 17 in the protected side of which are a plurality of air openings 18. On the outer end of tube 16 is mounted a flexible tube 19 having in its opposite end a removable tip 21.

In Figure 2, the tube 9 is shown in desoldering position with its end 11 surrounding a component terminal 23 soldered at 24 to the "printed" conductor 25 on a supporting board 26. It is seen that the end of tube 9 is in contact with the solder 24 surrounding the terminal 23 which melts substantially uniformly and thus avoids burning of the board.

In view of its use in the soldering gun which heats quickly and the desire to apply evenly distributed heat which will not burn the board, the tube 9 is, as stated, preferably of relatively high heat conductivity and low mass and with a bore of a diameter to fit over component terminals on the board.

As the solder 24 melts, suction is applied orally by the operator to the mouthpiece 21, creating a vacuum in the chamber 13 and sucking the solder thereinto where it is collected and quickly cooled.

Due to the interior curvature 17 of the tube 16, the openings 18 are protected from entrance of the molten solder which collects on the wall of chamber section 15 whence it may be easily removed after separation of the chamber sections since the solder will not adhere well to the porcelain or ceramic wall.

While at the temperatures normally used in melting solder, it is doubtful that metal dust or fumes such as of lead oxide will present any problem, it is conceivable that under abnormal conditions a danger to the operator might exist in the oral aspiration of the molten solder into the chamber 13. The earlier application above identified discloses a simple filter at 22 and the object of this invention is to provide in the suction or air train a filter more particularly adapted to the removal of any metal dust or fumes which might exist in the air train and thus insure protection for the operator.

A filter of this type is indicated at 20 in Figure 1 and shown in section in Figures 3 and 4. This filter has an air-tight chamber formed by a cup 30 and cover 27, each of which has a tubular extrusion at 28 and 29, respectively, which are connected in the tube 19. The filtering member 31 has deep circular corrugations as shown in Figures 3 and 4, and the walls 32 thereof present a large surface area in a small space to perform the filtering operation. A cross member 33 holds the member 31 in position within the cup 30 and spaced from cover 27. The central flat surface of member 31 is provided with an impervious coating 34 to spread the air outwardly into the corrugation pockets.

The corrugation surfaces on the fume side of filter 31 may be roughened to provide greater area and to prevent loading up of the filter.

The filter may be formed of a variety of materials such as cotton or wool felt and glass and synthetic resin fibers, with or without binders. The filtering action is chiefly one of mechanical straining although removal may also be effected by impingement and by electrostatic action with the charge self-generated by the air movement.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, means for applying oral suction to the tubular tip to remove the melted solder therethrough, and a protective filter in said means constructed to remove metal dust and fumes injurious to the operator from the air passing through said means.

2. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, and means for applying oral suction to the tubular tip to remove the melted solder therethrough including a flexible tube connected to the tip and terminating in a mouthpiece and a protective filter constructed to prevent injurious metal dust and fumes from passing through to the operator.

3. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, means including a suction chamber for applying oral suction to the tubular tip to remove the melted solder therethrough, said chamber serving also to collect the removed solder, an oral tube connected to said suction chamber to exhaust air therefrom, and a protective filter in the suction passage constructed to remove metal dust and fumes injurious to the operator from the air passing through the passage.

4. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, and means for applying oral suction to the tubular tip to remove the melted solder therethrough including serially connected oral tube, protective filter for the removal of metal dust and fumes injurious to the operator, and collecting chamber for the removed solder.

5. A desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder melting temperature, means for applying oral suction to said passage to remove the melted solder therethrough, and a protective filter in said means constructed to remove metal dust and fumes injurious to the operator from the air passing through said means.

6. A desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder melting temperature, means for applying oral suction to said passage to remove the melted solder therethrough, a substantially circular chamber having axially opposite inlet and outlet openings connected in said means, and a protective filter in said chamber for removing metal dust and fumes injurious to the operator from the air passing through said means, said filter having deep, pocket-like, circular, concentric corrugations, with the walls of said corrugations providing passage for said air.

7. A desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder melting temperature, means for applying oral suction to said passage to remove the melted solder therethrough, a substantially circular chamber having axially opposite inlet and outlet openings connected in said means, a protective filter in said chamber for removing metal dust and fumes injurious to the operator from the air passing through said means, said filter having deep, pocket-like, circular, concentric corrugations, with the walls of said corrugations providing passage for said air, and a central portion on said filter impervious to the passage of air to spread the air outwardly into the corrugation pockets.

8. A desoldering tool comprising a heat transmitting element having a passage therein of a size to receive a component terminal so that the surface of said element defining the exterior end of the passage will be presented relatively evenly to the solder about the terminal to effect melting of the solder, means for heating said element to solder melting temperature, means for applying oral suction to said passage to remove the melted solder therethrough, a substantially circular chamber having axially opposite inlet and outlet openings connected in said means, a protective filter in said chamber for removing metal dust and fumes injurious to the operator from the air passing through said means, said filter having deep, pocket-like, circular, concentric corrugations, with the walls of said corrugations providing passage for said air, and roughened surfaces on the fume side of the filter to inhibit its loading up with separated material.

References Cited in the file of this patent

UNITED STATES PATENTS

| | | |
|---|---|---|
| 1,221,221 | Rothfeld | Apr. 3, 1917 |
| 2,609,778 | Bleam et al. | Sept. 9, 1952 |
| 2,826,667 | Brillinger | Mar. 11, 1958 |
| 2,882,380 | Campo | Apr. 14, 1959 |